United States Patent
Zhang

[11] Patent Number: 5,676,111
[45] Date of Patent: Oct. 14, 1997

[54] METHOD AND ARRANGEMENT FOR CONTROLLING THE TORQUE OF AN INTERNAL COMBUSTION ENGINE

[75] Inventor: Hong Zhang, Regensburg, Germany

[73] Assignee: Robert Bosch GmbH, Stuttgart, Germany

[21] Appl. No.: 652,367

[22] Filed: May 23, 1996

[30] Foreign Application Priority Data

May 23, 1995 [DE] Germany .................. 195 18 813.6

[51] Int. Cl.$^6$ ............................................. F02D 35/00
[52] U.S. Cl. ............................................. 123/325; 123/423
[58] Field of Search .............................. 123/325, 327, 123/328, 423, 493

[56] References Cited

U.S. PATENT DOCUMENTS

| | | | |
|---|---|---|---|
| 4,700,673 | 10/1987 | Denz | 123/325 |
| 4,855,914 | 8/1989 | Davis et al. | 364/424.1 |
| 5,014,809 | 5/1991 | Matsuda | 180/248 |
| 5,072,712 | 12/1991 | Steinbrenner et al. | 123/677 |
| 5,113,820 | 5/1992 | Flaig | 123/325 |
| 5,186,080 | 2/1993 | Simon, Jr. et al. | 123/325 X |
| 5,515,824 | 5/1996 | Yamagishi et al. | 123/325 |
| 5,558,178 | 9/1996 | Hess et al. | 180/197 |

FOREIGN PATENT DOCUMENTS

| | | |
|---|---|---|
| 2139230 | 2/1973 | Germany . |
| 3630890 | 4/1987 | Germany . |
| 4230101 | 3/1994 | Germany . |
| 4236009 | 4/1994 | Germany . |

*Primary Examiner*—Tony M. Argenbright
*Attorney, Agent, or Firm*—Walter Ottesen

[57] ABSTRACT

The invention is directed to a method and an arrangement for controlling the torque of an internal combustion engine. A desired value is determined while considering the engine speed starting from a desired torque value to increase the engine torque during overrun operation when the engine brake torque is too high. With this desired value, the torque of the engine is adjusted in the sense of approaching the desired value.

10 Claims, 2 Drawing Sheets

METHOD AND ARRANGEMENT FOR CONTROLLING THE TORQUE OF AN INTERNAL COMBUSTION ENGINE

BACKGROUND OF THE INVENTION

German published patent application 2,139,230 discloses a method and an arrangement for controlling the torque of an internal combustion engine. Here, the suggestion is made to increase the operating means (fuel and/or air) to the engine and especially the supply of air thereto by appropriate control of a throttle flap in order to reduce engine torque when unwanted wheel slippage occurs at least at one of the drive wheels because of an engine torque which is too high. The increase of the supply of operating means takes place in this known so-called engine drag torque control (MSR) in dependence upon the magnitude of the determined slippage at the drive wheels of the vehicle. This means, however, that the relationship between the determined wheel slippage and the extent of the increase of the supply of operating means must be determined in each operating state for each motor vehicle and engine type. For this reason, the complexity of the application is correspondingly high. Furthermore, the precision of the adjustment of the supply of operating means is affected by this complex application.

U.S. Pat. No. 5,558,178 discloses converting a supplied desired torque value at least to an adjustment of the supplied air to an engine and/or to convert a correction of the ignition angle in the sense of an approximation of the torque to the pregiven desired torque value. The torque is outputted by the internal combustion engine.

U.S. Pat. No. 5,072,712 discloses a tank-venting control wherein a so-called charging factor is determined. This charging factor indicates the portion of the gasoline vapor in the air supplied via the tank-venting valve into the intake system of the internal combustion engine.

SUMMARY OF THE INVENTION

In view of the above, it is an object of the invention to provide measures in an engine drag torque control which make a precise adjustment of the torque possible with considerably reduced complexity.

A precise adjustment of the torque outputted by the engine is made possible when there is a tendency for at least one drive wheel to become blocked because of too high an engine torque.

It is especially advantageous that there is no great complexity of application when adapting to different motor vehicle types and engine types.

Special advantages result from the fact that an ignition angle intervention is provided in addition to the increase of the air supply for rapid reaction to the corresponding requirement. This ignition angle intervention ensures together with the intervention in the air supply a precise realization of the torque to be outputted by the engine.

Furthermore, it is advantageous that, if required, the effect of a tank-venting control on the engine torque can be considered.

It is especially advantageous that an electrically actuable adjusting element for carrying out the idle control can be utilized to influence the air supply to the engine. In this way, even conventional engine control systems (without electronic accelerator pedal) can be equipped with the arrangement according to the invention. The electronic accelerator pedal (EGAS-system) pertains to a configuration wherein, for example, the connection from the accelerator pedal to the throttle flap of the engine is not mechanical but is via an electronic circuit so that the throttle flap is actuated electrically.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
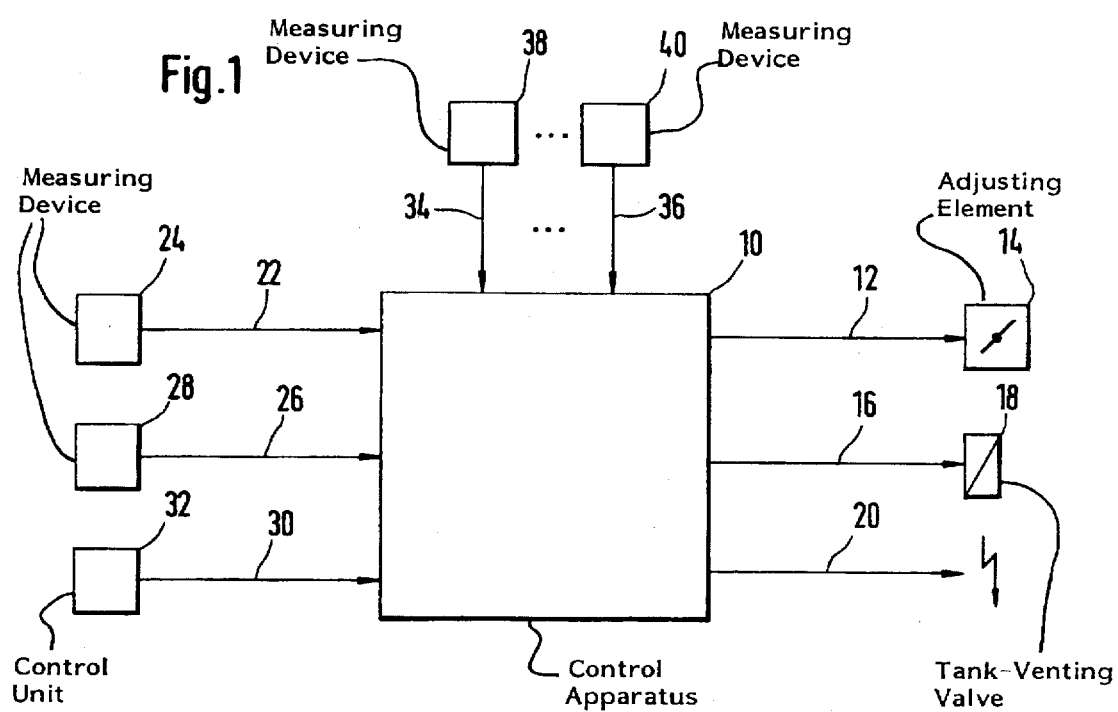
FIG. 1 is a block circuit diagram of an engine control system incorporating the arrangement of the invention; and, FIG. 2 shows an overview block circuit diagram for an embodiment of the arrangement according to the invention.

FIG. 1 is an overview block circuit diagram of a control unit for controlling the torque of an internal combustion engine. Only those elements of the engine control system are shown which are needed in the context of the engine drag torque control of the invention. In addition, the engine control system also includes functions and elements for fuel metering et cetera which are not shown in FIG. 1 for the sake of clarity.

The control apparatus 10 includes at least one microcomputer and controls an adjusting element 14 via an output line 12 in order to influence the air supply to the engine. This adjusting element 14 can be an electrically actuable throttle flap, an electrically idle adjuster in the bypass channel of the throttle flap or an electrically adjustable idle stop of a throttle flap.

In addition, the control apparatus 10 controls the ignition angle of the engine via an output line 20 and, in an advantageous embodiment, the control apparatus 10 controls a tank-venting valve 18 via a second output line 16. A signal indicative of the rpm of the engine is supplied to the control apparatus 10 via an input line 22 which is connected to a measuring device 24. Line 26 is connected to a measuring device 28. The control apparatus 10 is supplied via line 26 with a signal indicative of the load of the engine such as an air quantity signal, an air mass signal or an intake pipe pressure signal.

An input line 30 connects the control apparatus 10 to at least one further control unit 32. Control unit 32 can, for example, be an ABS/ASR control unit which computes a desired torque value in dependence upon slip at the drive wheels and supplies this torque value via the line 30 to the engine control apparatus 10. Also, input lines 34 to 36 are provided and connect to measuring devices 38 to 40. Measuring devices 38 to 40 supply the control apparatus 10 with further operating variables such as signals indicative of the exhaust gas composition, engine temperature, a knocking signal et cetera.

If, with the accelerator pedal released and the vehicle in overrun operation, the braking torque of the engine becomes so great that the drive wheels tend to block, then and in the context of the engine drag torque control (MSR), the engine torque is increased in order to counter the blocking tendency. For this purpose, a desired torque value Mdes is determined in the control unit 32 on the basis of the determined wheel slip value (difference between vehicle velocity and wheel velocity) as well as on the basis of the determined friction coefficient between wheel and roadway. The control unit 32 can also be a component of the control apparatus 10. This desired torque value characterizes the drive torque transmitted from the engine to reduce the blocking tendency at the wheel. This drive torque is the torque to be outputted by the engine to the crankshaft.

The desired torque value Mkupdes is transmitted via the line 30 (preferably via a communication system such as CAN) to the control apparatus 10. The control apparatus 10 then computes a control value for adjusting the air supply to the engine and/or for adjusting the ignition angle from the supplied desired torque value in the manner described below. The computed torque is outputted to corresponding actuating elements via the lines 12 or 20 so that the torque outputted by the engine corresponds essentially to the supplied desired torque.

In addition, and in an advantageous embodiment, the control apparatus 10 includes a so-called tank-venting control which conducts air from the tank of the vehicle into the intake system of the engine under specific conditions by opening a valve by means of a control signal. Such a tank-venting control is known from the state of the art referred to initially herein.

Figure 2:
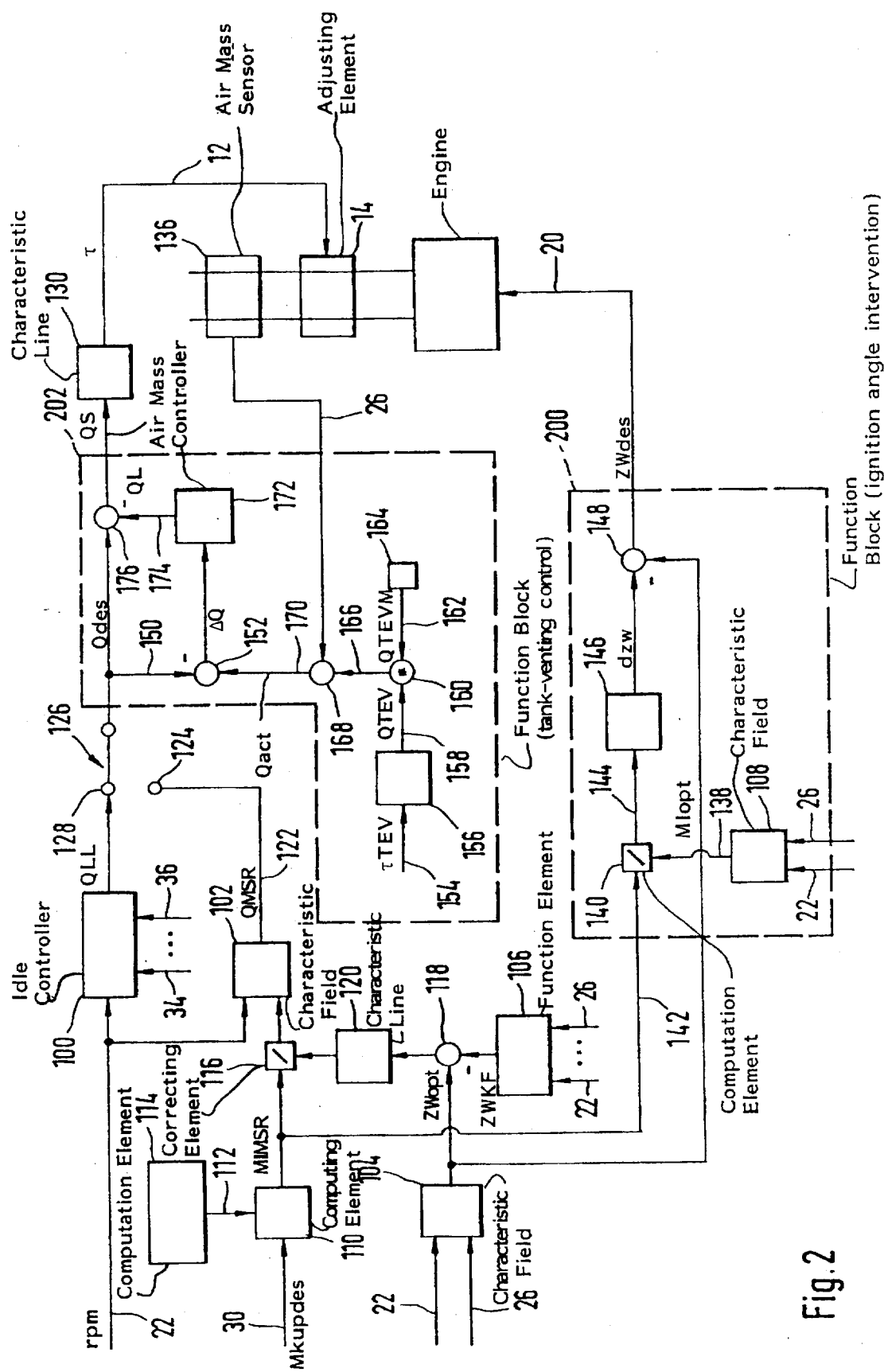

FIG. 2 shows a detailed block circuit diagram of the control apparatus 10 with respect to the invention.

The line 22 transmits a signal for the engine rpm to the control apparatus 10. This line is connected to several function blocks within the control apparatus 10, namely, an idle controller 100, a characteristic field 102 for determining the air mass desired flow QMSR from the desired torque value MIMSR, a characteristic field 104 to determine optimal ignition angle ZWopt which is determined with reference to an optimal efficiency of the engine, a function element 106 to determine the ignition angle ZWKF as well as a further characteristic field 108 to determine the torque MIopt outputted when the optimal ignition angle is adjusted. The line 26 conducts the signal corresponding to engine load and leads to the characteristic field 104, the function element 106 and the characteristic field 108.

In a preferred embodiment, the function shown in FIG. 2 includes the adjustment of the air supply to the engine in dependence upon the pregiven desired torque value for active engine drag torque control. In advantageous embodiments, this preferred embodiment can be supplemented by an ignition angle intervention (function block 200) and/or by a correction of the air quantity to be adjusted in dependence upon a tank-venting control (function block 202).

In the preferred embodiment, the control unit 32 outputs via the line 30 of the control apparatus 10 a desired value for the torque Mkupdes to be outputted at the output of the engine. This torque is conducted via the line 30 to a computing element 110. There, the desired combustion torque MIMSR is determined while considering the lost torque supplied via the line 112 from a computing element 114. The determination of the lost torque from predetermined characteristic lines in dependence upon engine rpm and engine temperature is known from the state of the art referred to initially herein.

To determine the desired combustion torque from the desired coupling torque, the lost torque is added to the coupling torque in the computing element 110. The lost torque is that portion of the torque generated by combustion which is lost because of internal friction of the engine. Alternatively, and in lieu of the coupling desired torque, the desired combustion torque is formed in the additional control unit 32 and transmitted via a communication system (for example, CAN) to the control apparatus 10. The desired combustion torque MIMSR is directed to the correcting element 116 wherein the desired combustion torque is corrected utilizing the adjusted ignition angle as criterion. This is done because the characteristic field 102 was determined assuming an operation of the engine having an optimal ignition angle. For this reason, the ignition angle ZWKF adjusted by the engine control system is subtracted from the optimal ignition angle formed in the characteristic field 104. This basic ignition angle is formed on the basis of engine rpm, engine load as well as further influences such as knock control, protective measures for a catalytic converter et cetera.

The basic ignition angle ZWKF is subtracted from the optimal ignition angel ZWopt in the logic element 118. The difference dzws is converted in the characteristic line 120 into an ignition angle efficiency and this efficiency is outputted to the correcting element 116.

In the correcting element 116, the desired combustion torque value MIMSR is divided by the ignition angle efficiency and the corrected desired combustion torque value is converted in the characteristic field 102 into a desired air mass flow QMSR in accordance with the rpm (engine speed) supplied via the line 22. The desired air mass flow QMSR is conducted via the line 122 to a first terminal 124 of a switching element 126.

Depending upon the switching position, the switching element 126 connects either the terminal 124 or a second terminal 128 to a characteristic line element 130 which forms a drive signal τ for the adjusting element 14 from the particular desired air mass flow supplied. The characteristic line element 130 comprises essentially a characteristic line formed according to the characteristic line of the adjusting element 14.

The switching element 126 normally is in a position in which it connects terminal 128 to the element 130. If a requirement from the engine drag torque control is present (that is, if at least one drive wheel tends to block as a consequence of the excessive engine torque in the presence of a released accelerator pedal), then the switching element 126 switches over to terminal 124. In this case, the desired air mass flow formed from the desired torque of the engine drag torque control is transmitted to the characteristic line element 130 and the adjusting element 14 is correspondingly adjusted via the line 12. Outside of the engine drag torque control, the switch element 126 connects the characteristic line 130 to the idle controller 100. The idle controller 100 determines an air mass desired value QLL in accordance with a pregiven control strategy. This air mass desired value QLL is determined in such a manner that the actual engine speed supplied via the line 22 approximates a desired value. This desired value is formed from operating variables such as engine temperature, battery voltage et cetera which are supplied via the lines 34 to 36.

In a preferred embodiment, the indicated desired torque, which is requested by the engine drag torque control, is converted into a desired value for the air mass flow with the aid of the engine speed. This air mass flow flows into the cylinders. When computing the desired air mass flow, consideration is given to the condition that the ignition angle adjusted by the control apparatus 10 distinguishes without intervention of the optimal ignition angle for which the air mass characteristic field had been fixed for determining the desired air mass flow.

In a preferred embodiment, an intervention into the ignition angle of the engine is undertaken to improve the dynamic of the intervention. This is done supplementary to or in the alternative to the air intervention. The function element 200 serves this purpose. The combustion torque MIopt is determined for optimal ignition angle from engine speed and engine load in characteristic field 108 via a so-called charging model. This value is supplied via the line 138 to a computation element 140. This computation element 140 forms the ratio between the desired combustion torque supplied via the line 142 and the combustion torque for optimal ignition angle supplied via the line 138. This ratio corresponds to the desired efficiency of the ignition angle. The ratio is conducted via the line 144 to a characteristic line element 146 which converts the desired ignition angle efficiency into an ignition angle corrective value dzw. This ignition angle corrective value dzw is subtracted from the optimal ignition angle ZWopt in the comparative position 148 to form the desired ignition angle ZWdes. This desired ignition angle ZWdes is adjusted via the line 20.

The ignition angle intervention is possible up to a desired ignition angle which corresponds to the optimal ignition angle. A torque increase which goes beyond this is not possible via the ignition angle. If the ignition angle intervention is utilized supplementary to an air intervention, then, for a torque command, a shift in the ignition angle occurs first which is supplemented by the slower air intervention when the torque increase is not adequate.

Furthermore, in one embodiment, a compensation of the ignition angle intervention by means of the air intervention and a return of the ignition angle to the base ignition angle can be advantageous.

The ignition angle intervention is inhibited in a further advantageous embodiment. The desired torque is then adjusted exclusively via the charge; whereas, the desired ignition angle corresponds to the base ignition angle formed by the engine control apparatus.

In a further advantageous embodiment, and supplementary to the solutions already shown, a correction of the air intervention is carried out by function block 202 in the context of the air intervention in dependence upon the leakage air flowing via the throttle flap as well as the actuating signal of a tank-venting control.

For this purpose, and downstream of the switching element 126, the desired air mass value then present is tapped via the line 150 and supplied to a comparator element 152. The drive signal quantity for the tank-venting valve τTEV is supplied via the line 154. A corresponding air mass flow value QTEV is formed from the drive signal quantity in a characteristic field 156 (represented as actuating element characteristic line). The air mass flow value QTEV is conducted via the line 158 to the multiplier position 160. There, the air mass value is multiplied by the charging factor which is supplied from a computation element 164 via a line 162. In this way, the air mass flow QTEVM, which is supplied via the tank-venting valve, is formed. This air mass flow QTEVM is supplied via the line 166 to the logic element 168. The charging factor is determined in a manner described initially herein. The air mass flow supplied via the tank-venting valve is logically combined with the air mass value in the logic element 168 to form the actual air mass value Qact (addition). The air mass value Qact is detected by the measuring device 136. The actual air mass flow Qact is then supplied via the line 170 to the comparator element 152 wherein the difference ΔQ between the actual and desired mass flow values is formed. This difference defines a measure for the leakage air flowing via the throttle flap. A corrective value QL is formed in the air mass controller 172 from the difference ΔQ. The corrective QL is subtracted from the desired air mass flow Qdes in the logic element 176. The desired air mass flow QS is formed by this difference formation and functions then to drive the adjusting element 14 with the drive signal τ formed in characteristic line element 130.

Consideration of the leakage air flowing via the throttle flap when forming the desired air mass flow then takes place via the use of the air mass flow controller 172 which controls out the difference between the desired input Qdes and the actual air mass flow Qact. Furthermore, the air mass sensor 136 determines only the air mass flow via the throttle flap and, if required, the idle adjuster but not the air mass flow via the tank-venting valve. For this reason, the actual air mass flow is corrected by addition of the air mass flow, which flows from the tank-venting valve, to the measured air mass flow.

In another advantageous embodiment, consideration of the air mass flow from the tank-venting valve can be omitted. Then, the opening of the tank-venting valve during intervention of the engine drag torque control is inhibited.

In addition to the described embodiment on the basis of air mass flow values, the computation of the function on the basis of air quantity values or intake pipe pressure values is provided in an advantageous embodiment.

A preferred realization of the method of the invention is provided in the context of a program for the microcomputer of the control apparatus 10.

A precise conversion of the torque requested by the engine drag torque control is obtained without significant additional complexity with the method and arrangement according to the invention.

It is understood that the foregoing description is that of the preferred embodiments of the invention and that various changes and modifications may be made thereto without departing from the spirit and scope of the invention as defined in the appended claims.

What is claimed is:

1. A method of controlling torque of an internal combustion engine, the method comprising the steps of:
 controlling at least one operating parameter which influences said torque;
 increasing said torque to reduce braking action of said engine in overrun operation when there is a tendency to block at least one wheel by a control of said at least one operating parameter;
 supplying a desired value of said torque to be increased; and,
 converting said desired value of said torque into a control value for said at least one operating parameter while at least considering the rpm of said engine so that the torque outputted by the engine approaches said desired value.

2. The method of claim 1, further comprising the step of transforming the desired torque value into a desired value of the air supply to said engine while considering the influence of the ignition angle and utilizing the engine speed.

3. The method of claim 2, further comprising the step of adjusting said air supply desired value utilizing an electrically actuable adjusting element which influences the air supply.

4. The method of claim 2, wherein the variable representing the air supply is one of the air mass flow, the air quantity and the intake pipe pressure.

5. The method of claim 1, further comprising the step of transforming said desired torque value into a corrective ignition angle by comparing said desired torque value to the optimal combustion torque derived from the engine speed and engine load.

6. The method of claim 2, further comprising the step of correcting said air supply desired value in dependence upon the leakage air flowing over the throttle flap.

7. The method of claim 2, further comprising the step of correcting said air supply desired value in dependence upon the air supplied via a tank-venting valve of said engine.

8. The method of claim 7, further comprising the step of inhibiting opening of the tank-venting valve during an operating state wherein an increase of torque occurs.

9. The method of claim 1, further comprising the step of increasing the torque during overrun operation in the context of an engine drag torque control when there is a tendency to block the drive wheels because of an engine brake torque which is too high.

10. An arrangement for controlling the torque of an internal combustion engine, the arrangement comprising:

sensing means for sensing at least one operating parameter of the engine which influences the torque thereof;

a control apparatus including:

means for increasing the torque of said engine in overrun operation when the engine braking torque is too high by controlling said at least one operating parameter;

an input element to which a desired value is supplied for the magnitude to which said torque should be increased; and, a computing unit for determining a control value for said operating parameter from said desired value at least in accordance with the rpm of said engine, so that the torque outputted by said engine approaches said desired value.

* * * * *